(12) United States Patent
Kirbie

(10) Patent No.: US 6,217,122 B1
(45) Date of Patent: Apr. 17, 2001

(54) DUAL USE VEHICLE WITH ROLLING HOPPER AND METHOD

(75) Inventor: Martin Kirbie, Grand Prairie, TX (US)

(73) Assignee: JHC Holding Company, Irving, TX (US)

(*) Notice: Subject to any disclaimer, the term of this patent is extended or adjusted under 35 U.S.C. 154(b) by 0 days.

(21) Appl. No.: 09/272,953

(22) Filed: Mar. 19, 1999

(51) Int. Cl.$^7$ ....................................................... B60P 1/16
(52) U.S. Cl. ............................... 298/17.5; 298/7; 298/12; 298/27; 298/17.8
(58) Field of Search ................................... 298/7, 12, 24, 298/27, 29, 31, 33, 35 R, 17.5, 17.8; 296/184; 105/250

(56) References Cited

U.S. PATENT DOCUMENTS

| | | |
|---|---|---|
| 2,663,231 | 12/1953 | Wood . |
| 2,667,361 | 1/1954 | Jones . |
| 2,718,429 | 9/1955 | Birdwell . |
| 2,752,193 | 6/1956 | Kling ................... 298/22 P |
| 2,803,491 | 9/1957 | Brown ..................... 298/7 |
| 2,878,053 | 3/1959 | Yuncker ................... 298/7 |
| 2,983,548 | 5/1961 | Harbers et al. ........... 298/10 |
| 3,202,440 | 8/1965 | Apgar, Sr. . |
| 3,232,666 | 2/1966 | Hutchinson . |
| 3,759,573 | 9/1973 | Rosenbaum ............. 298/29 |
| 3,907,364 | 9/1975 | Hnath ................... 298/17.5 |
| 3,917,084 | * 11/1975 | Swisher, Jr. et al. ......... 298/27 X |
| 4,289,353 | 9/1981 | Merritt ................. 298/22 R |
| 4,527,939 | 7/1985 | Suarez . |
| 4,541,517 | 9/1985 | O'Rielly ................... 298/7 |
| 4,557,400 | 12/1985 | Clarke . |
| 4,573,850 | 3/1986 | Suarez . |
| 4,576,398 | 3/1986 | Kinne . |
| 4,733,451 | * 3/1988 | Voigt ................. 298/17.7 X |
| 4,871,188 | 10/1989 | Baxter . |
| 4,883,321 | 11/1989 | Voigt ................... 298/27 X |
| 4,948,324 | 8/1990 | Niederer . |
| 5,006,039 | 4/1991 | Niederer . |
| 5,242,185 | 9/1993 | Carr et al. . |
| 5,244,069 | 9/1993 | Cosgrove . |
| 5,344,271 | 9/1994 | Bratlie et al. ............ 298/7 |
| 5,470,096 | 11/1995 | Baxter . |
| 5,549,359 | 8/1996 | Hoss et al. ............. 298/35 M |
| 5,551,759 | 9/1996 | Hoss et al. ............. 298/22 P |
| 5,749,595 | 5/1998 | Hoss et al. . |
| 5,957,538 | * 9/1999 | Sullivan ................ 298/17.5 |

* cited by examiner

Primary Examiner—Stephen T. Gordon
(74) Attorney, Agent, or Firm—Haynes and Boone, L.L.P.; John W. Montgomery

(57) ABSTRACT

A dual use belly dumping and end dumping vehicle is provided, including a frame, having left and right side beams connected together to form an opening therebetween. The frame is mounted on rear wheels for transport. A hopper with sides, ends and an openable bottom is carried in the opening between the left and right side beams in the frame. Rollers are mounted to the sides of the hopper for rollingly supporting the hopper on top of the left and right side beams of the frame. Pivot bars are mounted on the frame above the rear wheels. Pivot-engaging sockets are mounted on the hopper for engaging the pivot bars when the hopper is rolled rearward along the side beams, constructed for releasably engaged pivoting of the hopper about the pivot bars to a dumping position at which an end of the hopper dumps the content thereof behind the rear wheels to which the frame is mounted. Hydraulic cylinders are mounted between the sides of the frame and the sides of the hopper for retractably rolling the hopper from a first transport position to a second pivot engagement position and to a third pivoted dumping position.

1 Claim, 9 Drawing Sheets

DUAL USE VEHICLE WITH ROLLING HOPPER AND METHOD

BACKGROUND OF THE INVENTION

In the past, vehicles for the purpose of transporting sand, gravel, paving materials and other loose materials which are relatively heavy have often been required to be specialized, either for the type of materials which must be carried or for the particular conditions under which the vehicles must operate. Many vehicles are primarily used in general construction for conveying, moving or delivering large quantities of sand, concrete, rocks, earth or paving materials. Often, large quantities of materials must be transported long distances over existing roadways. Depending upon the particular application, the transported materials may need to be dumped from the belly of the vehicle. Sometimes, vehicles may be required which allow the materials to be dumped from the end of the vehicle. In the past, vehicles which dumped from the belly typically required one specific type of construction. Other vehicles which dumped from the end, as by raising the front end of a truck bed and letting the contents slide through a tailgate, required a different type of construction.

Some types of work or construction may have enough use for a particular specialized dumping activity to justify constructing a particular type of vehicle for the intended purpose, whether belly dumping or end dumping. Other jobs may require more than one specialized dumping capability. Often, there is a need to have one or only a few transport and dumping vehicles which might be useful for multiple purposes. Most available trailers and vehicles are only for one particular purpose, as, for example, the end-dumping trailers shown in U.S. Pat. Nos. 2,718,429; 2,983,548; and 3,232,666. Most of such end-dumping vehicles are entirely without belly-dumping capabilities. Belly-dumping vehicles have also been known; however, such vehicles typically are highly specialized for the particular belly-dumping operation intended, without end-dumping capabilities.

An early attempt to overcome the drawbacks of separate vehicles for specialized purposes included a combination belly-dump/end-dump vehicle for hauling materials, which was disclosed in U.S. Pat. No. 4,289,353. This disclosure showed a vehicle which was intended to be capable of either end dumping or belly dumping. The disclosure showed a vehicle, which included a frame mounted upon wheels and which provided a first pivot support and a second pivot support, with the first pivot support at least level with or lower than the second pivot support. A hopper for containing the materials to be transported and dumped was carried by the frame. The hopper was described as having a gate means located at the bottom for belly dumping. In its lowered or transport position, an arm from the rear of the hopper engaged the first pivot support. A telescopic ram was provided between the front of the frame and the front of the hopper for raising the front end of the hopper and for lifting the hopper rotatably about the first pivot support. After pivoting to a particular angle and before dumping was initiated, a top edge of the hopper became pivotably engaged with the second pivot support. The first and second pivots were alternately engaged upon hydraulically raising the front end of the hopper so that the materials dumped out of the rear of the hopper over the rear of the frame, preferably only after the second pivot engagement occurred. The vehicle disclosed provided the first pivot support ahead of the rear wheels. The second pivot support was shown positioned behind the rear wheels of the vehicle to permit dumping the contents behind the vehicle, not on the frame or rear wheels. Thus, unless the trailer vehicle was securely attached downward in the front, a heavy load in a fully tilted hopper acted downward on a "lever" extending behind the rear axle and that tended to lift the front end of the trailer. Also, the telescopic hydraulic cylinder was attached ahead of the hopper, apparently for maximum leverage when pivoting the hopper. This construction required an extremely long hydraulic cylinder stroke to fully pivot the hopper. A hydraulic cylinder with a large number of telescoping hydraulic stages would be required for a vehicle with this design. Also, the frame for the vehicle, as disclosed, was of a construction requiring multiple side beams extending from the front to the rear of the vehicle along the sides of the hopper to be supported. Upper and lower parallel side beams were provided on each side of the hopper, apparently to provide adequate strength and stability for a fully loaded hopper.

Further, the alternatingly engageable pivot support connections were depicted as including round bar stock pivot bars attached to the hopper and semicircular sockets secured, upwardly directed, on the vehicle for pivotably receiving the pivot bars of the hopper. These upwardly directed sockets did not hold the hopper downward in place when transporting. The weight of the hopper and payload and the hydraulic cylinder attachment were relied upon for holding the hopper down into the frame during transport. Further, when the hopper pivot bars were not engaged in the upwardly opened pivot sockets, the sockets could accumulate rocks, gravel or other materials, as, for example, from loading or unloading the payload. Thus, the lower pivot supports or sockets could accumulate debris when the hopper was pivoted rearward and engaged in the upper pivot sockets for end dumping. The upper sockets could accumulate debris when the hopper is in its lowered/non-pivoted position. When the pivot bars engaged and rotated in the sockets, unnecessary wear and abrasion resulted.

Prior trailers, having belly-dumping capability, were typically provided with bay doors, which typically had to be continuously maintained in a closed position with externally applied force, as with a pneumatic cylinder. The doors were typically actuated to either a fully closed position for filling and transport or to a fully open position for dumping the load of material. The weight of the load in such prior hopper designs continuously acted to push the doors to an open position.

In some alternative of hopper doors, such as those depicted in U.S. Pat. No. 4,289,353, a "clamshell gate" was described as being operated, either hydraulically or pneumatically. The means of operation was not fully described in the '353 patent, as it was said that the operation thereof was known in the art. However, as depicted in the drawings of the '353 patent, the clamshell gates had a substantially continuous arcuate shape, with the lowest part of the arc along the center line of the hopper. Large actuating cylinders were provided to pivot the clamshells either fully closed or fully open. The actuating cylinders were typically air-operated cylinders, which were convenient for purposes of the use of tractor/trailer rigs of the type commonly fitted with air brakes and a corresponding air pressure-generating system. Such pneumatic cylinders did not lend themselves to partial opening, but rather were either fully actuated to an open position or fully actuated to a closed position. Unless a mechanical latch was also used to maintain the clamshell gate into a closed position, the air-operated cylinders would need to maintain a seal so that either pressure or vacuum, depending on the configuration, kept the doors in a closed position until such time as the doors were to be opened, when the cylinders would be actuated so that the gates or the doors would be moved outward to a fully open position. Thus, in these devices, it appears that the forces of granular material against the clamshell doors continuously tended to open the doors.

The opening of the doors with "on" or "off" pneumatic type actuators was sufficiently quick so that one need not be concerned with which of the doors opened first or fastest. Both of the doors, if operating properly, moved swiftly to the fully open position to allow for complete dumping.

Most earlier trailers, of all types, which have had multiple rear wheel assemblies, have had a plurality of vertically extending support struts, typically interposed between each axle, or each set of wheels. The support struts were constructed of a rigid material, supported from a horizontal frame member, above. These support struts were typically made in pairs, one on either side of the trailer. At the lower end of each support strut was a fastening means at which a spring, such as a leaf spring, was connected and suspended between a support strut ahead of an axle and a support strut behind an axle. In the case of two rear axles, typically three pairs of left and right support struts were used: one front pair, one middle pair and one rear pair. The leaf springs were suspended from the middle struts toward the front strut and from the middle strut toward the rear strut. Attached to each of the leaf springs was an axle, and a shock absorber mechanism was also appropriately affixed. Because of the large diameter of the tires, the support struts were required to extend a substantial distance from the upper horizontal frame member, thereby requiring both substantial strengthening of the horizontal member, as well as substantial strengthening of the vertical struts. The vertical struts had to be designed against cantilever forces, acting at a significant lever arm distance from the attachment point at the horizontal frame member.

Many of the drawbacks of the early prior trailers were overcome by aspects of U.S. Pat. Nos. 5,749,595, 5,551,759 and 5,549,359. The dual use vehicle or trailer described and claimed in those prior patents continued to require a significant amount of heavy structure to provide proper dual use capabilities. Because of certain physical and regulatory limitations for roads and bridges, the amount of weight of the trailer structure reduced the payload that could be carried.

SUMMARY OF THE INVENTION

These and other deficiencies and of the prior transport and dumping vehicles and trailers are overcome and other advantages are provided by the current invention of an improved dual use belly- and end-dumping vehicle with roller hopper support. In particular rollers attached to the hopper to rollingly support the hopper on the frame. This provides a reduction in the weight of the vehicle. Rollers are attached on both sides of the hopper to rollingly support the hopper on top of the side beams. The hopper is rolled rearward using hydraulic pressure. Pivot sockets on the end of the hopper engage pivot bars at either side of the vehicle. The hydraulic pressure then pivots the hopper so that the content of the hopper is dumped past the end of the vehicle. By using the angled chute, the rear pivot point may be advantageously positioned ahead of the rearmost wheels. A rear chute carries dumped materials past the rearmost wheels for unobstructed dumping behind the vehicle, rolling the hopper rearward for dumping, instead of using dual pivot points and sturdy pivot arms to carry significant hopper loads, significantly reduced the overall weight of the rear dumping mechanism. The entire structure, particularly the side bars, can also be made shorter using the roller support for the hopper. After dumping, the hopper can be rolled forward for subsequent loading. Rolling the hopper forward properly distributes the weight on forward and rear wheels of the vehicle.

Another aspect of the present invention is to provide two side-mounted hydraulic cylinders, which are attached at an acute angle relative to the side bars of the vehicle and are strategically positioned with respect to the dimensions of a particular vehicle or trailer for providing a horizontal component of force for rolling the hopper and also provide force at a desired moment arm distance relative to the pivot point for end dumping.

BRIEF DESCRIPTION OF THE DRAWINGS

The foregoing objects, advantages, and features, as well as other objects and advantages, will become more apparent with reference to the description and drawings below, in which like numerals represent like elements and in which.

DETAILED DESCRIPTION OF THE PREFERRED EMBODIMENTS

Figure 1:
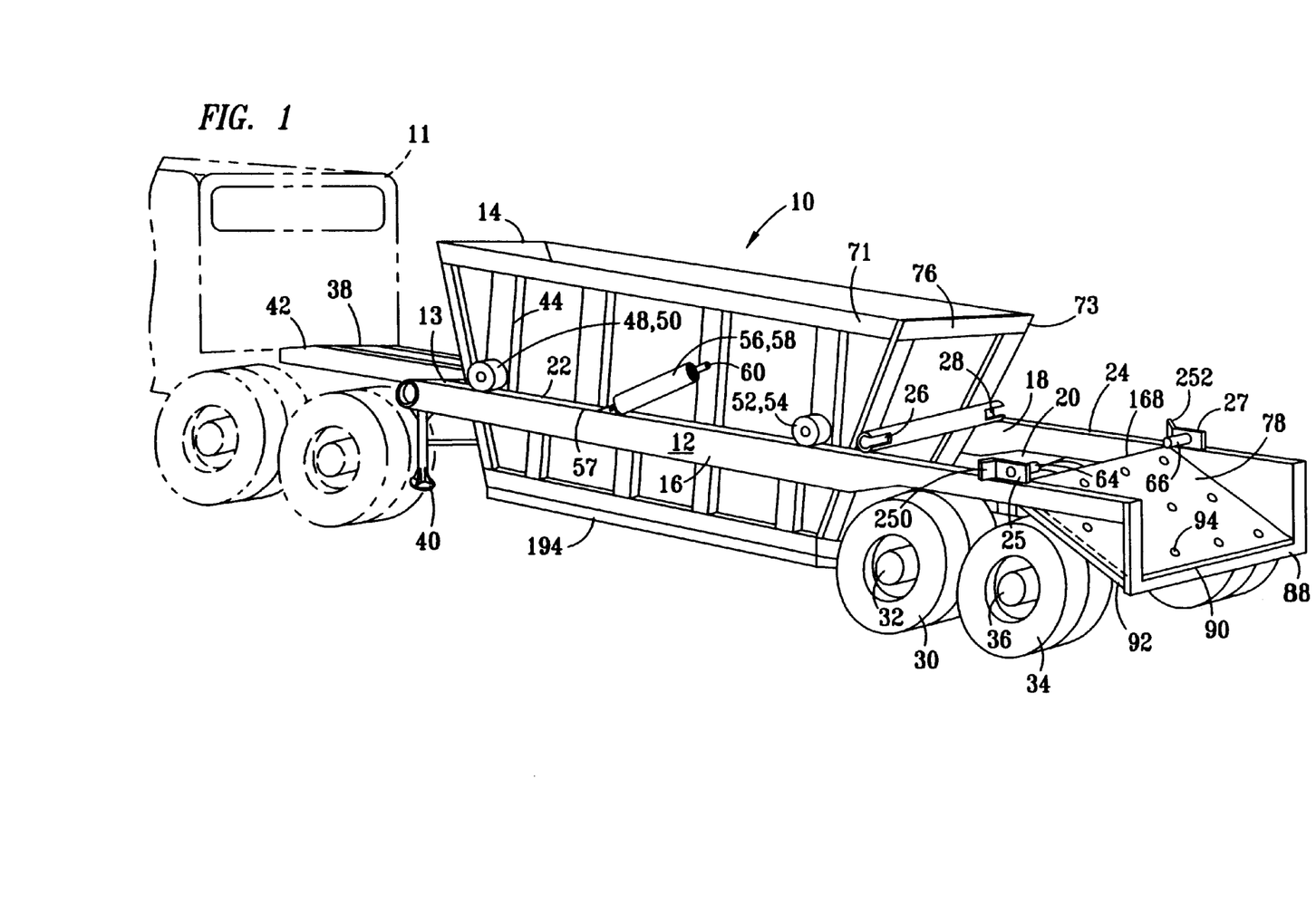
FIG. 1 is a side plan view of an improved dual use bottom and end dumping trailer shown with the hopper supported on rollers in the bottom-dumping position according to the present invention.

FIG. 1 shows a side perspective view of a materials transporting vehicle 10 having dual dumping capabilities, including bottom dumping and end dumping. The vehicle includes a frame 12, which is constructed for carrying a hopper 14 in which transported materials, such as gravel, sand, asphalt and other heavy materials, which exhibit some of the characteristics of fluid material in that they may be dumped or may flow either from the bottom bay doors of the hopper or from the end of a tipped hopper. The frame 12 may, for example, be constructed as a self-powered vehicle (not shown) or, preferably, may be advantageously constructed in the form of a semitrailer 13 which may be pulled at 42 with a truck tractor 11 (shown in phantom). This allows for the dual-use vehicle 10 to be formed with any standard trucking rig without requiring self-motorization.

The frame 12 includes a left-side frame 16 and a right-side frame 18. It will be noted that "left" and "right", as used herein, will be adopted according to the convention of a forward moving vehicle, viewing the vehicle from the rear so that the observer's left becomes the vehicle's left and the observer's right becomes the vehicle's right. Unless otherwise indicated, the vehicle 10, frame 12 or semitrailer 13 are typically bilaterally symmetrical so that the right side is a mirror image of the left side. A hopper receiving opening 20 is formed between the left- and right-side frames. A left-side hopper support surface 22 and a right-side hopper support surface 24 are, according to the embodiment depicted, provided by the tops of left- and right-side frames 16 and 18. A left lower pivot support 26 and right lower pivot support 28 (only partially shown in FIG. 1) are rigidly attached to and extend below side frames 16 and 18, respectively.

As depicted, a first set of rear wheels 30 are mounted along a first rear axle 32, with an additional set of wheels 34 mounted along an additional axle 36. These axles are preferably mounted through a rigidified suspension 35, which uniquely includes horizontal rails 37 and 39, so that the suspension is supported both from the sides with cross beams 82 and 84 (shown in FIG. 2) and from the back of frame 12 at cross beam 86. While the number of wheels depicted includes four wheels on each of two axles 32 and 36, it will be understood that this is consistent with standard eighteen-wheel tractor and semitrailer rig construction. The number of axles or the number of wheels on a vehicle 10 or on a semitrailer 13 may be varied according to the length of frame 12 and load carrying requirements. For example, a trailer or vehicle may have three rear axles or may have additional axles and wheels (not shown) attached to the frame ahead of the hopper to provide additional load-carrying capabilities. However, significant advantageous aspects of the location of the rear wheels with respect to hopper pivot points on the embodiment shown will be discussed more fully, below. In the embodiment shown, there is a trailer tongue 38, which may be supported at the front end of the trailer off of the ground with left and right legs or landing gear 40 and 41. The tongue 38 may also include a hitch or "fifth wheel" 42 by which the trailer is attached to a truck.

The hopper 14 is positioned in opening 20 between the left- and right-hand frame members 16 and 18. The frame members 16 and 18 provide support surfaces 22 and 24 against which front and rear left hopper support arms 44 and 45 on the left and front and rear right hopper support arms 46 and 47 (not shown in FIG. 1) on the right. Support arms 44, 45, 46 and 47 are advantageously positioned spaced-apart toward each corner of the hopper so that a stable transport is achieved.

Uniquely and further advantageously, rollers 48 and 50 are secured to the hopper at lower portions of support arms 44 and 45 and rollingly contact support surface 22. Also at support arms 46 and 47, rollers 52 and 54 are secured for rolling contact against support surface 24 on the other side beam of frame 12. Also attached between the frame 12 and the hopper 14 are lifting devices 56 and 58 and, preferably, concurrently actuatable hydraulic cylinders 56 on the left and 58 on the right (58 not shown in FIG. 1—See FIG. 3). The hydraulic cylinders 56 and 58 are advantageously attached to the left frame 16 at a left partially rotatable attachment 57 and at a right partially rotatable attachment 59 (again, not shown in FIG. 1—see FIG. 3). The left and right partially rotatable attachments 57 and 59 may advantageously comprise clevis and pin or pin and eyelet arrangements 57 on the left and 59 on the right. Similarly, left cylinder 56 and right cylinder 54 are attached to the hopper at left partially rotatable hopper attachment 60 and right partially rotatable hopper attachment 62, which may also be clevis and pin or pin and eyelet arrangements to allow each cylinder to partially rotate at either end about an axis which is parallel to the hopper pivot axis formed by an imaginary line between left pivot element 64 and right pivot element 66, which are attached to the frame 12 through left pivot support 26 and right pivot support 28.

The left and right pivot sockets 26 and 28, respectively, according to one embodiment, may be sockets attached to the hopper at the rear and between the top and bottom of the hopper. In a preferred embodiment, left and right pivot sockets 26 and 28 are aligned for linear movement into and out of pivot engagement with bars 64 and 66, projecting horizontally inward from the respective pivot supports 25 and 27. Corresponding pivot sockets 26 and 28 that are secured to the hopper 14 may be rolled rearward, rotatably engage the pivot bars 64 and 66. The pivot sockets are rigidly affixed to the hopper 14.

Figure 2:
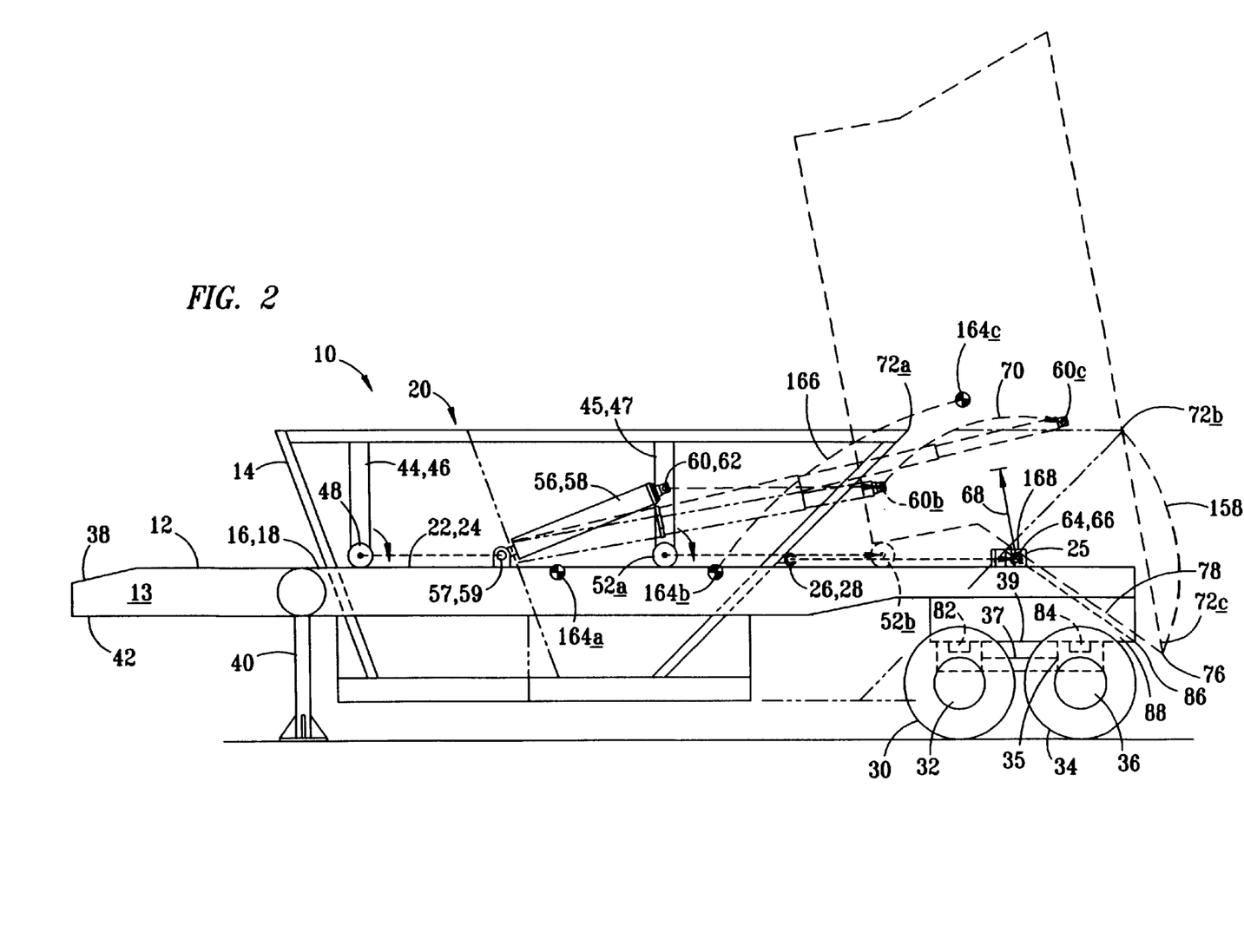
FIG. 2 is a side plan view of an improved dual use bottom and end dumping trailer shown with a hopper in its transport position (a) and showing (in phantom) rolled to a rearward position (b) to engage pivots and also showing (in phantom) the hopper pivoted upward into an end dumping position (c) according to the present invention.

FIG. 2 is a side plan view with the operation of the end dumping function schematically depicted in phantom. In operation, the hydraulic cylinders 56 and 58 are actuated simultaneously to roll the hopper rearward until the pivot sockets 26 and 28 engage pivot elements 64 and 66. The hopper 14 is then stopped from rolling Additional hydraulic pressure in cylinders 56 and 58 act about a moment arm 68 to pivot the hopper 14 along an upward arc path 70 until the rear tip 72 of hopper 14 opening 20 pivots from point 72(b) to a dumping position at point 72(c). Materials carried within the hopper 14 are then poured out of the hopper by the force of gravity over rear edge 76 and are further guided with rear chute 78 over the end 88 of trailer 13 and out beyond and, preferably, downward at an angle out beyond the rearmost set of wheels 34. This operation will be explained more fully, below; however, it should be noted that the position of left pivot support 64 and right pivot support 66 are advantageously positioned ahead of the rearmost set of wheels 34, with the rear chute 78 advantageously directing the materials being dumped beyond the rearmost wheels 34. This positioning avoids the rearmost axle 36 acting as a fulcrum about which the trailer 13 might otherwise pivot because of the weight of the hopper and payload. Where the upper pivot axis is behind the rearmost axle, the weight of the pivoting hopper might tend to lift the front of the trailer. Instead, with the advantageous construction disclosed here, the weight is borne by the wheels and axles without causing the trailer to tip.

Thus, from the schematic side plan view of FIG. 2, the operation of an improved dual use belly- and end-dumping trailer can be understood. The basic transport position is shown in solid lines, with the hopper in a horizontal transport position (a) and showing in phantom lines the hopper pivoted rearward into a transition pivot engaged position. The end dumping upwardly pivoted position (c) is also shown in phantom. In this schematic embodiment, the designation of a given element in its transport hopper position is designated with the number of the element number and the letter "a", the hopper rolled to the transition position of a given element is designated with the element number and the letter "b", and the hopper pivoted upward position of an element is designated with the element number and the letter "c".

It has been found that during this operation of the improved rear-dumping vehicle, materials within hopper 14 will, at a certain point, begin to spill over its rear edge 76. Also, it has been found that with a fully loaded hopper 14, the center of gravity will be approximately midway between the upper edge and the belly and approximately midway from the front wall to the rear wall, such as at the imaginary circle designated 164a in the initial horizontal transport position. The center of gravity 164a will initially move along an arcuate path 166, having as its center point the center axis between bars 64 and 66. This path 166 of the center of gravity will continue to be arcuate until the pivoting is sufficient steep that the contents begin to shift within hopper 14. In the case of a liquid, this would begin almost immediately so that the liquid would remain level at the top. However, in the case of solid, granular material, such as sand, gravel, grain or other similar solid, granular material, a certain amount of resistance to movement will prevent immediate shifting. Thus, it has been found that for construction materials, such as sand and gravel, shifting of the center of gravity and movement of the contents will begin between about 20° and 40° of pivoting. With a normally loaded hopper, the contents can begin to spill over the edge 76 after about 40° of pivotable rotation. Thus, the rear-angled chute 78 advantageously extends to a front edge 168, forward of the upper pivot bars 64 and 66, and, preferably, the angled chute 78 extends forward of a point 72(d) along the arcuate path 158, which corresponds to the initial spillage of the type of material to be carried in the hopper, so that any initially spilled material lands on the front edge 168 of angled chute 78. Thus, the chute 78 guides poured materials, even in situations where the flow begins before engagement of upper socket pivots 71 and 73, with upper pivot bars 64 and 66.

Figure 3:
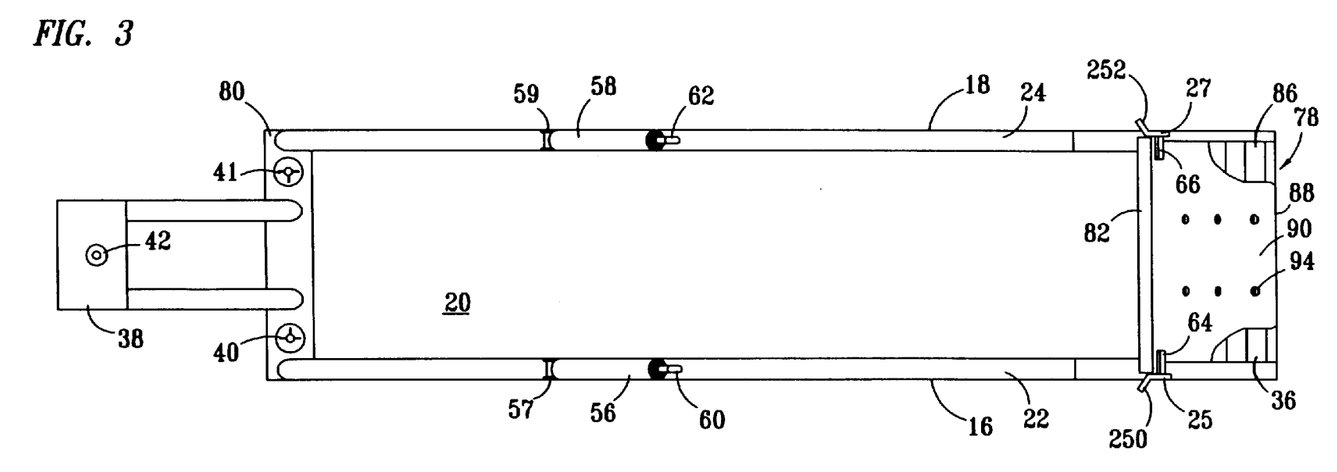
FIG. 3 is a top plan view of an open box trailer frame construction of the vehicle of FIGS. 1 and 2, having the hopper removed.

FIG. 3 is a top plan view of the vehicle frame 12 (in this particular case, frame 12 of trailer 13). The construction of frame 12 with front cross beam 76 and rear cross beam 82 is depicted in FIG. 3, so that the opened area 20 is more fully understood. Additional rear cross beams 84 and 86 also advantageously hold the rear of the frame together and provide support for axles 32 and 36. An end beam 86 provides strength to the rear edge 88 of chute 78. Chute 78 may be advantageously provided with a smooth, low-friction surface 90, which may, in a preferred embodiment, comprise a plastic sheet cover 90, which is attached to a structural rear chute support 92, which may be an angled plate of steel attached to the frame 12. Attachment fasteners 94 secure the plastic sheet cover 90 to chute support 92. The attachment fasteners 94 may be large, flathead screws or bolts which securely hold the plastic sheet cover 90 in a relatively flat and secure position to form a sliding surface at the bottom of an angled chute 78, as described above. The attachment fasteners 94 are, preferably, removable to allow the rear chute cover 90 to be removed and replaced as abrasion and wear occurs. The underlying support plate 92 will remain intact, without degradation. In a preferred embodiment, sides of chute 92 and also the interior surfaces of hopper 14 may also be covered with an abrasion-resistant, reduced friction plastic material. Particularly, the rear hopper wall 190 might be advantageously covered with such a plastic sheet material. Such a plastic covering, which is also heat-resistant, is particularly advantageous in situations where hot asphalt or other hot, sticky composite or aggregate materials may be used.

In the preferred embodiment, the frame members 16 and 18 are advantageously constructed as box beams having top plates, bottom plates and side plates. The details of construction of the box beams, according to the present invention, will be more fully understood with reference to FIG. 4, which is a schematic perspective view of a preferred embodiment of the left box beam 16. It will be understood that similar construction is preferred for a right box beam 18. In the embodiment depicted in FIG. 4, the box beam may advantageously be constructed of a first side plate 96 and a second side plate 98, having a top plate 100 and a bottom plate 102. In the preferred embodiment, the top plate 100 is welded to the first side beam 96 at a 90° angle with respect to plate 96. Although the structure can be welded with the side plates in the vertical position, as shown, a fixture can also be advantageously used in which top plate 100 and side plate 96 are each angled at approximately 45° with respect to vertical during welding (not shown). A continuous bead of weld is made along the length of the beam at corner 104. The 45° angle of each plate causes the weld to advantageously flow, by the force of gravity, relatively evenly into both top plate 100 and side plate 96. Similarly, bottom plate 102 is also welded at a 90° angle to first side plate 96, and both are held, for welding purposes, angled at approximately 45° from vertical (not shown), so that the weld along corner 106 flows relatively evenly by the force of gravity into both side plate 96 and bottom plate 102. It is desirable to have spaced-apart support struts on the interior of the constructed box beam 16. It has been found to be further advantageous to have a plurality of support struts 108, 110, 112, 114, 116, 118 and 120 within plate 122, each rigidly welded to side plate 96 and also to the inside of top plate 100 and the inside of bottom plate 102. Alternatingly interposed with the support struts securely welded to side plate 96 is another plurality of support struts 124, 126, 128, 130, 134 and 136, each securely welded vertically to side plate 98, preferably at spaced-apart regular intervals for interdigitated insertion between the support struts, which are welded to first side 96. Second side plate 98 is positioned adjacent to first side 96, with the support struts interdigitatedly interposed, and the entire assembly is desirably held in a fixture so that top plate 100 and second side plate 98 are angularly disposed at 45° from vertical, and a weld is applied all of the way along the junction of edge 140 on top plate 100 and edge 142 on second side plate 98. The entire assembly is then rotated approximately 90°, so that side plate 98 and bottom plate 102 are also positioned each at 45° from vertical, and a weld is applied therealong between edge 146 of bottom plate 102 and edge 148 of second side plate 98. The right side frame 18 is similarly advantageously constructed as a box beam 18 in a fashion substantially the same as with box beam 16, shown in FIG. 4. Both box beams 16 and 18 are then attached by welding to a front cross beam 80 and to rear cross beam 82 to additional rear cross beam 84 and to end beam 86 to form the main body of the frame. The tongue 38 is attached, as by welding, to the front cross beam 80, and other attachments, such as pivot supports and rear axle suspension, can be attached by welding or bolting to form a frame assembly.

Figure 4:
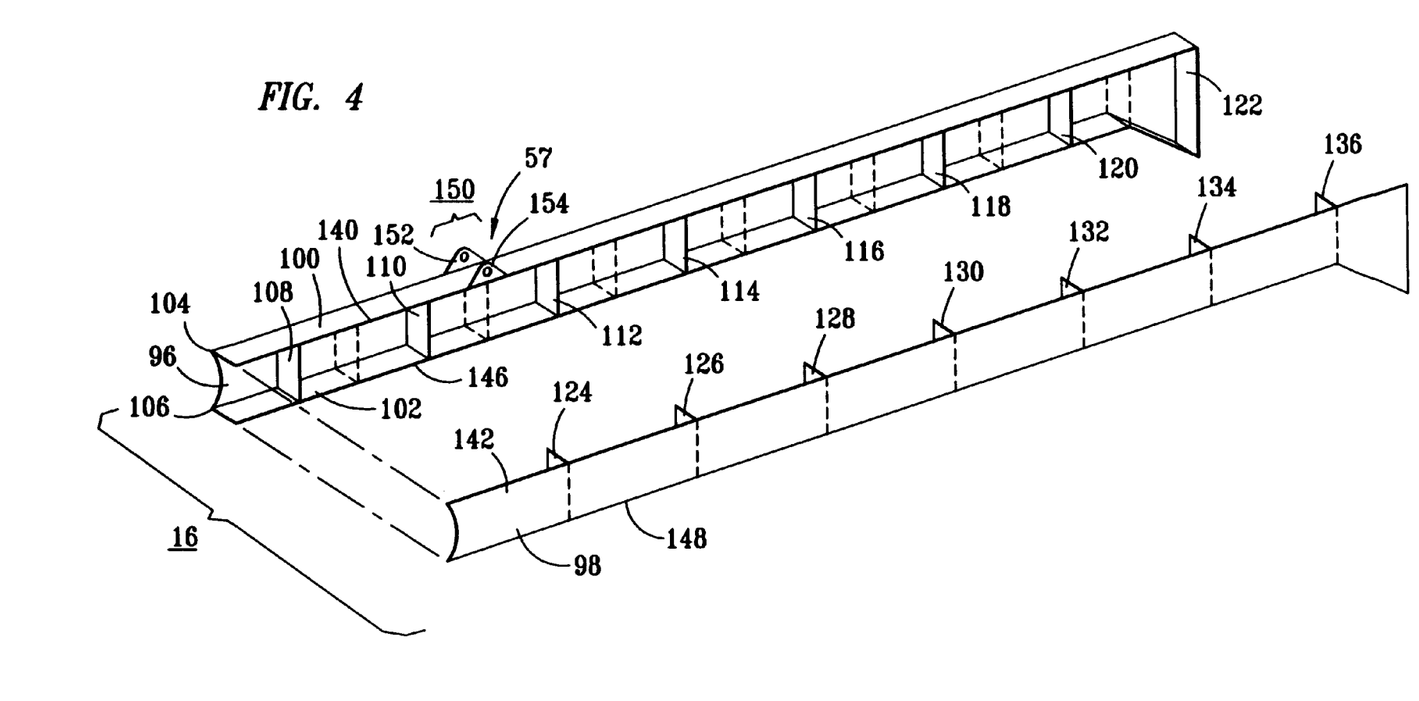
FIG. 4 is a schematic partial assembly view of one side support member of the trailer frame, uniquely constructed for withstanding significant forces required for pivoting a filled hopper into an end dumping position according to the present invention.

The left partially rotatable attachment 57 which left hydraulic cylinder 56 will be attached to the top 100 of box beam 16, may preferably be formed by welding parallel, spaced-apart clevis brackets 152 and 154 to top plate 100.

According to the desired construction of box beams the side plates 96 and 98 and top plates 100 and 102 act together to provide structural strength against bending caused by force applied by cylinder 56 through attachment57. Vertical struts 108, 110, 112, 114, 116, 118, 120 and 122 act to rigidify side plate 96, as well as top plates 100 and 102, against buckling. Similarly, vertical support struts 124, 126, 128, 130, 132, 134 and 136 are directly welded to side plate 98 to prevent side plate 98 from buckling. Also, the close spatial relationship with the vertical struts, even where they are not welded directly to more than one plate, acts to prevent the side plates and the top and bottom plates from buckling inward. Thus, by uniquely interdigitating the support struts, all of the exterior plates of the box beams are rigidified against buckling. With this construction, one box beam on either side of the frame adequately and advantageously provide strength sufficient for carrying a fully loaded hopper, and further for lifting the hopper in a pivoted fashion using side-mounted cylinders.

Figure 5:
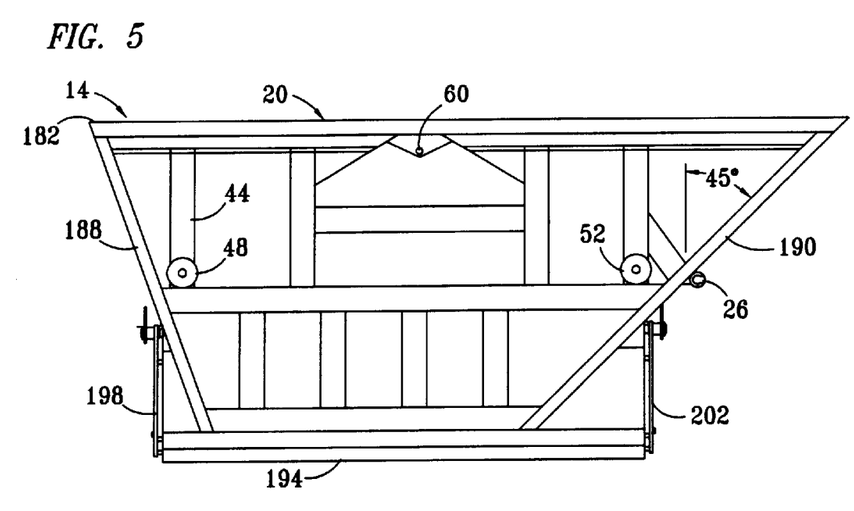
FIG. 5 is a side view of a belly-dumping and end-dumping hopper removed from the trailer frame.
Figure 6:
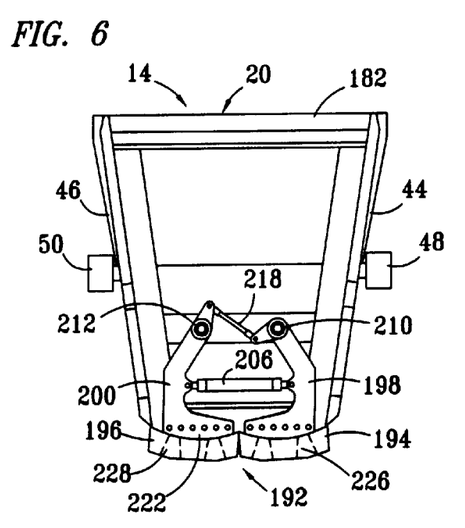
FIG. 6 is a front elevation view of the hopper of FIG. 5.
Figure 7:
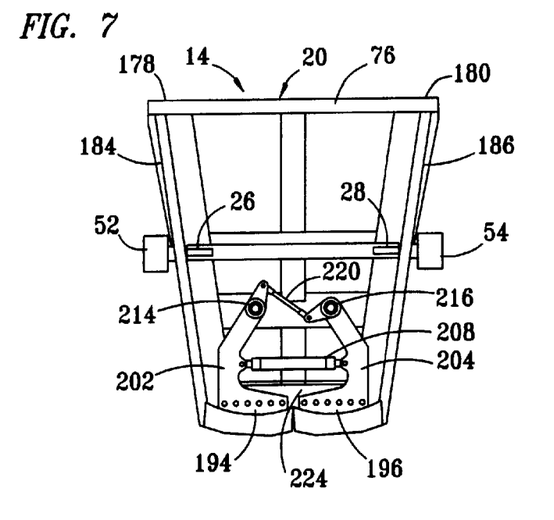
FIG. 7 is a rear elevation view of the hopper of FIGS. 5 and 6.

FIG. 5 is a side plan view of the hopper 14, according to one embodiment of the present invention. FIG. 6 is a front-end view of the hopper 14 of FIG. 5, and FIG. 7 is the rear-end view of the hopper 14 of FIG. 5. Hopper 14 is constructed with a top opening 20, defined by a rear edge 76, side edges 178 and 180 and front edge 182. Side walls 184 and 186, front wall 188 and rear wall 190 all angle inwardly toward a belly opening area 192. The back wall 190 is, preferably, at an angle of about 45° so that it forms an end-dumping chute for the hopper 14, which need not be pivoted very far beyond 90°, total pivoting, in order to provide an adequate discharge angle of about 45° for chute 190 when used in the end-dumping mode. When the hopper 14 is used in the belly-dumping mode, the 45° angle of the rear wall 190 is also adequately steep. The other walls 184, 186 and 188 are all at a substantially steeper angles than 45°, so that belly dumping is facilitated and sufficient carrying capacity is maintained.

The belly-dumping discharge area 192 is blocked with doors 194 and 196. These doors are constructed to be actuated to be opened or closed with left and right actuator arms 198 and 200 in the front and left and right actuator arms 202 and 204 in the rear. The actuator arms are actuated simultaneously using front cylinder 206 and rear cylinder 208, respectively. Arm 198 is pivoted at 210, arm 200 is pivoted at 212, arm 202 is pivoted at 214 and arm 204 is pivoted at 216. Each arm is securely affixed to one of the belly doors, so that arms 200 and 204 are affixed to belly door 196 and arms 198 and 202 are affixed to belly door 194. Further, advantageously, an adjustment mechanism or a timing mechanism, 218 at the front and 220 at the rear, are arranged to cause both doors 194 and 196 to be opened the same amount in each direction and/or to be closed the same amount in each direction, depending upon the actuation of cylinders 206 and 208. Cylinders 206 and 208 desirably act simultaneously in concert with each other, so that the front opening and the rear opening are consistently maintained.

The doors are also uniquely constructed in an arc shape so that they may be smoothly opened about pivot points 210 and 214 with respect to door 194 and about an axis formed by pivot points 212 and 216 with respect to door 196. The arcuate shape of the doors corresponds to the double arcuate shape formed in front end plate 222 and rear end plate 224, so that the hopper 14 is maintained in a substantially closed condition without gaps being formed at either end. Because of the arc shape, the doors may still be moved to an opened position with a smooth pivoting rotation of each door and arm with respect to its respective pivot axes. The doors 194 and 196 are also uniquely constructed with a rigidifying, bracing structure, schematically depicted at 226 and 228 in FIG. 6. This rigidifying structure allows the doors to extend along the entire length of the hopper belly while carrying a heavy load over long distances and often over rough roads and terrain typical of construction sites where loading and dumping may be required.

It will also be observed that, advantageously, the pivot positions formed by pivots 210 and 214 and pivots 212 and 216 are positioned inward from the hopper side walls 184 and 186. Preferably, the pivots are inward a sufficient distance to be more than halfway toward the center from each respective side wall 184 and 186. Thus, the center of gravity of the mass of the load carried by each of the doors acts downward with a small horizontal lever arm to pivot each door inward. This holds doors 194 and 196 inward with respect to each other, when loaded, due to the weight of the mass being carried. In this fashion, relatively small hydraulic cylinders 206 and 208 may be advantageously used to slowly open the doors, thereby emptying a metered amount of material. This has been found to be preferable in many cases, over dumping an entire load instantaneously, as previously achieved with pneumatically actuated cylinders, which were typically actuated either fully closed or fully opened. Further, this provides an additional safety feature so that, when loaded, the doors hold themselves closed and force must be applied in order to open the doors.

Figure 8:
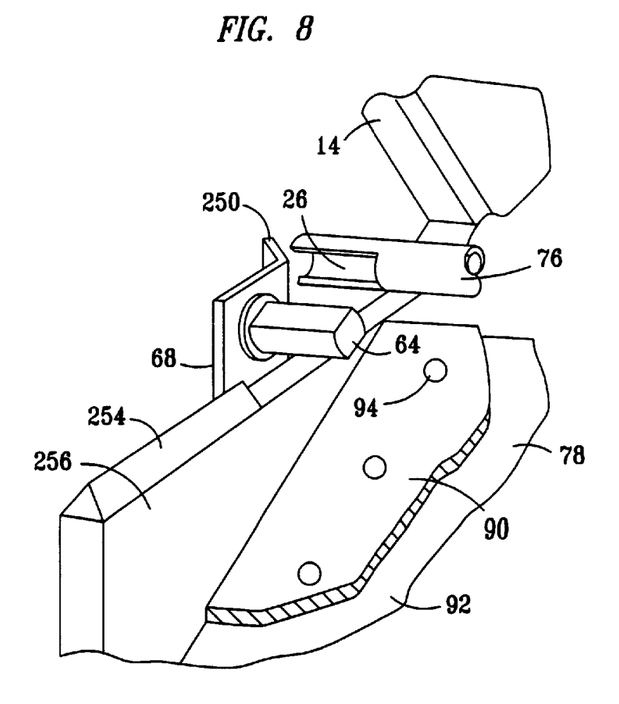
FIG. 8 is a partial, perspective view of one of the pivot shafts and corresponding upper pivot collar on the hopper and an upper pivot mount and guide block on the frame according to a preferred embodiment of the present invention.

Other advantageous features may be more fully understood with respect to FIG. 8, which is a partial, enlarged perspective view of pivot bar 64, upper pivot socket 26, shown attached above the angled chute 78, and also showing the support structure 68 for holding pivot bar 64. Support structure 68 advantageously has a forward extending, angled guide surface 250, by which any initial, small misalignment between hopper socket 26 with pivot bar 64 will be directed along the slope of angled guide 250 back into pivotable engagement. Thus, if all of the manufacturing tolerances and/or wear at the pivot connections is directed to one side, as where the vehicle is on a side incline, the angled support guide surface 250 acts to move the socket 26 back to an engagement position. A similar right side angled guide surface 252 will also be attached to support 70 on the right side for guiding socket 28 into engagement with upper pivot bar 66.

The angled flat surfaces of pivot bars 64, 66, 72 and 74 all act to deflect any accumulation of debris. Also, in order to prevent accumulation of debris and material along the top surface 22 of beam 16, a tapered top surface 254 is provided along the rear chute wall 256.

Figure 9:
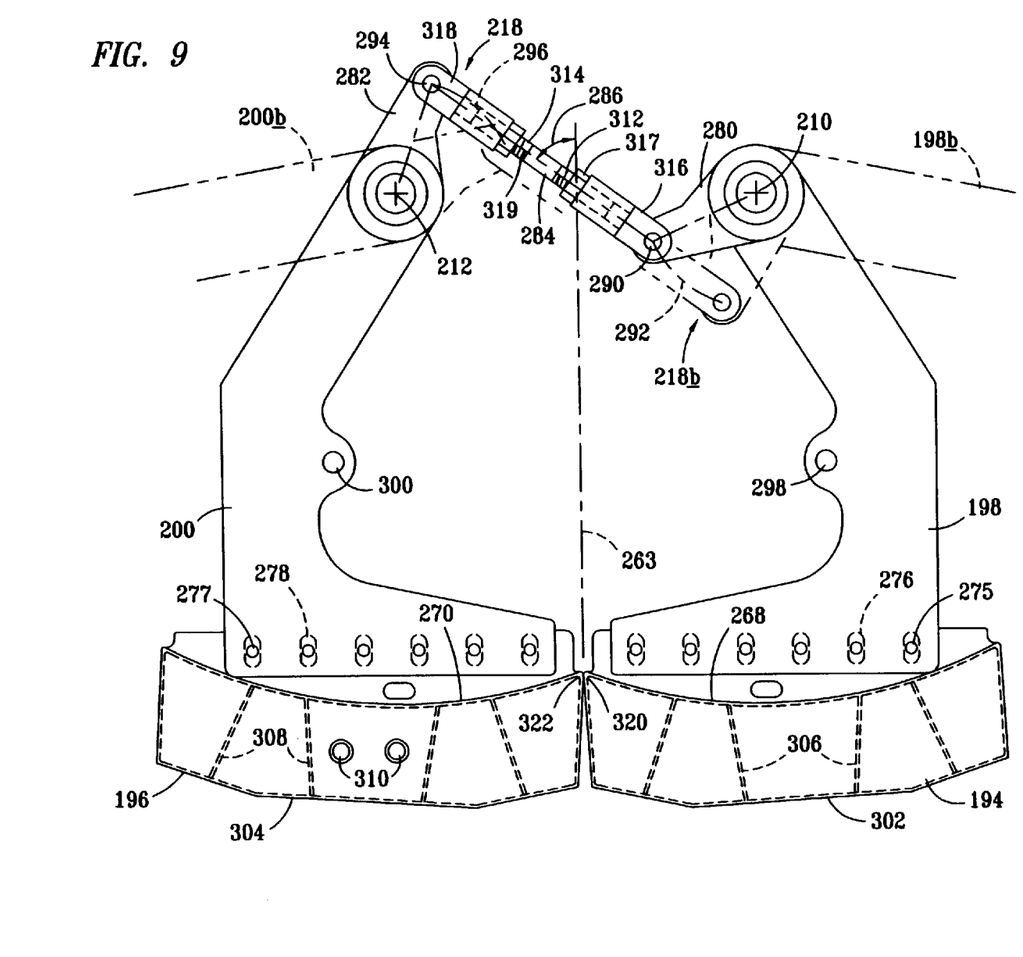
FIG. 9 is a front schematic plan view of a hopper, having the belly door assemblies attached thereto, depicting the belly doors in a closed position (shown in solid lines) and in a fully open position (shown in phantom lines)

FIG. 9 shows a schematic end elevation view of the hopper 14, having front actuator arms 198 and 200, shown in a closed position 198a and 200a, respectively, with the actuating cylinder 206a also in a retracted, closed position. In this position, the belly bay doors 194a and 196a are also in the closed position. Shown in phantom lines are the belly bay doors 194b and 196b in an open position. The belly bay doors are actuated with actuating cylinder 206*b* to an extended position, thereby actuating arms 198*b* and 200*b* to an outwardly pivoted position. The arms 198 and 200 pivot about pivot points 210 and 212, respectively. In the embodiment depicted, the center of gravity of the material loaded into hopper opening 20 will be at 260, along center line 262. Center line 262 corresponds to a vertical plane about which the hopper and vehicle are essentially bilaterally symmetrical, except as noted primarily with respect to the timing mechanism 218, as will be discussed more fully below. With respect to the load carried by belly bay door 194*a*, the center of gravity of that portion of the material in hopper 14 will effectively be at the left center of gravity 264. The right hopper bay door 196*a* will support the material in hopper 14, which acts simply at the right center of gravity 266. (Again, "right" and "left" are relative to the vehicle, looking from the rear). Pivot point 210 is desirably spaced inward toward center line 262 from the left center of gravity 264. Similarly, pivot point 212 is positioned inward of the expected center of gravity 266 for the right-hand portion of the material in hopper 14. With this unique arrangement and positioning of pivot points 210 and 212, and further because of the arcuate shape of interior surfaces 268 and 270 of belly bay doors 194*a* and 196*a*, respectively (which arcuate shape allows the center of gravity 264 and 266 to act substantially vertically downward upon the belly bay doors with respect to the centers of rotation at pivot points 210 and 212), the doors are held by the force of the load into a closed position. In the preferred embodiment depicted, the effective moment arms 272 and 274, with respect to the pivot points 210 and 212, are approximately one-fifth of the distance from the center line 262 to a side wall 184 or 186. This moment arm depicted is relatively short, compared with the moment arm for the actuating cylinder 206. Thus, the amount of force from the load or the torque which is holding the doors closed can be overcome by a reasonably sized hydraulic cylinder 206, which acts through a significantly larger moment arm when moving the doors from a closed position toward an open position. The moment arm for the action of the cylinder decreases as the doors open, as cylinder 206*b* moves effectively closer to pivot points 210 and 212. However, as the material is being dumped, its volume, mass and weight within the hopper continuously decreases as the doors are opened. Also, as the doors 194 and 196 move increasingly toward the open position, the weight supported by each door decreases. Preferably, a hydraulic cylinder is selected so that the force of the cylinder, multiplied times its moment arm, is more than adequate to open the belly bay doors to any desired opening position.

The unique construction and positioning of the arms, the pivot points and the structure of the curvature of the doors permits partial opening of the belly bay doors so that partial dumping can be accomplished. It has been found that doors which are angled downwardly to an inverted apex at the center line 262 would not provide the same moment arms 272 and 274, as provided with the curved belly doors, as depicted. The curved belly doors approximate a horizontal surface, which is therefore acted upon by forces directed normal to, or perpendicular to the surface, because the behavior of granular material is similar to a fluid under pressure, which acts in a direction normal to the surface of the container in which the fluid is held. Horizontal belly bay doors, if used with properly positioned pivot points, would act in the manner as described to hold the doors in a closed position under the load; however, such horizontal flat doors would not function to pivot out of the way without binding at the lower edges of walls 184 and 186. Thus, by providing the unique combination of the curved doors which, having a radius substantially equal to the distance from the pivot points 210 and 212, and with the pivot points 210 and 212 spaced outwardly from the center line 262 less than halfway to the side walls 184 and 186, respectively, allows the belly bay doors to both be held in a closed position by the weight of the granular material in the hopper and also to be pivoted outwardly without binding at the lower edges. The lower front edge of front end wall 188 and the lower rear edge of rear end wall 190 are therefore provided with double-hump plates 222 and 224, corresponding in shape to the interior surfaces 268 and 270 of doors 194*a* and 196*a* when in a closed position.

In a further preferred configuration of the hopper doors, a "bias" is put on the radius of curvature of the doors to reduce binding of the load against the doors when they are pivoted to an open position. The radius of the curve of the doors is purposefully offset slightly so that each inner edge 320 and 322 is slightly below radii, drawn from each arm pivot pin center 210 and 212, respectively. Thus, the curved surfaces 268 and 270 are below imaginary arcs 320 and 322, as would be drawn by radii 209 and 211, pivoted about arm pivot centers 210 and 212. This downward spacing, or offset, of the door in the middle of the hopper opening is necessarily small, because it tends to counteract the effect of the offset of each arm pivot pin from the center of each door, which holds the doors closed. For doors having radii of curvature of about 27 inches, and with the arm pivot points 210 and 212 only a few inches inward, compared with the position of the centers of door surfaces 268 and 270, the downward offset 319 would measure about 1 inch, or less. The downward spacing, or offset, of the curved surface of the doors causes the doors to relieve themselves away from the load as they are opened; that is, the effect or the result is that each door pulls downward a fraction of an inch away from the loaded material as it opens. Without the "bias", the doors (if they are built to have exactly the same radius of curvature for surfaces 268 and 270 as the pivot radius) must drag past the loaded material, requiring more effort by the door's hydraulic cylinders. Conversely, if the radius is "biased" the wrong way, as if not made correctly, the doors will be much harder to open and the hydraulic pressures would need to be increased accordingly. In such an instance, insufficient clearance at the lower edge of the hopper opening could also cause binding between the curved surface of the doors and the lower edges of the hopper opening. If they are "biased" too much, the tendency to remain closed will be diminished or lost.

Further, advantageously, a timing mechanism 218 is uniquely constructed and attached so that both doors 194 and 196 open the same amount, but in opposite directions, in response to actuation of hydraulic cylinder 206.

Figure 10:
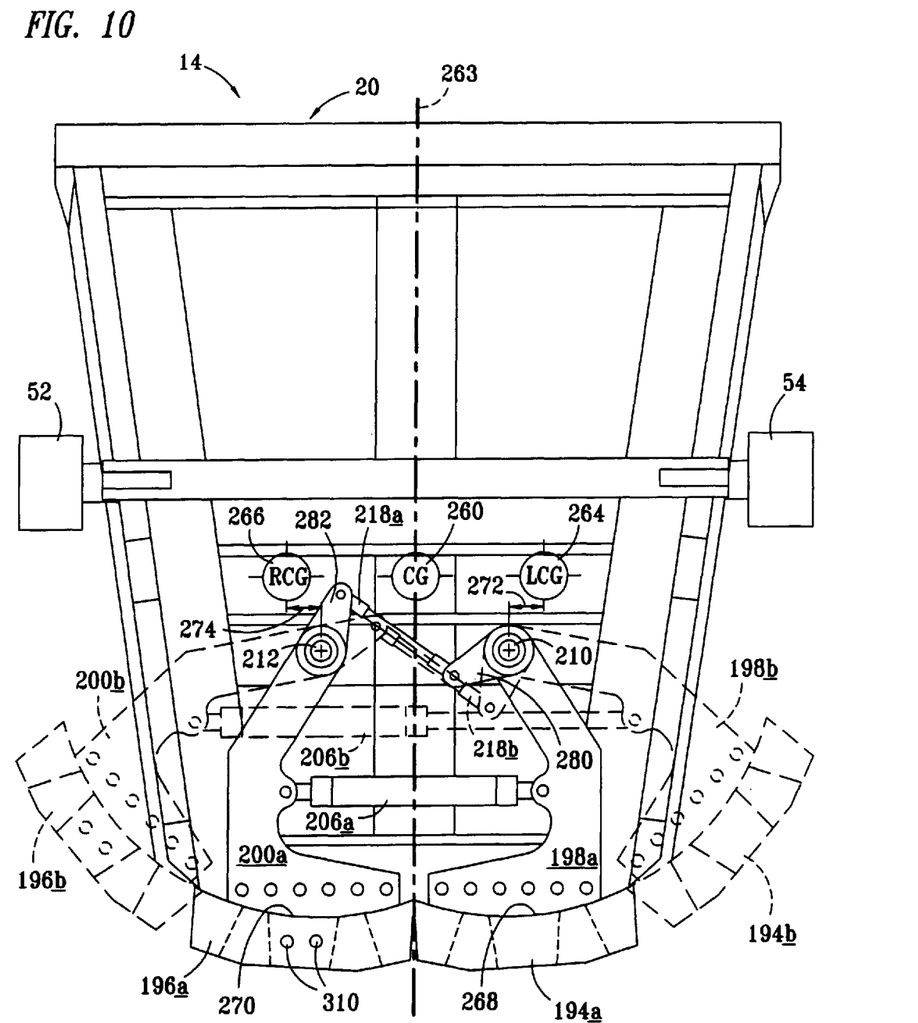
FIG. 10 is a schematic plan view depicting the hopper belly door arm assemblies with a timing mechanism and door closure adjustment mechanism, depicted in a closed position (shown in solid lines) and partially depicted in an open door position (shown in phantom lines)

The construction and operation of timing and adjustment mechanism 218 and all of the parts of which this mechanism is constructed can be more fully understood with reference to FIG. 10. FIG. 10 shows a large schematic view of a pair of actuator arms 198 and 200, attached to a corresponding pair of belly bay doors 194 and 196. The bay doors are bolted or otherwise secured to actuator arms 198 and 200 as at a series of mounting holes 275 and 277, respectively. The mounting holes 275 and 277 and/or corresponding mounting holes 276 and 278 in doors 194 and 196, respectively, may be elongated to allow adequate adjustment so that the doors appropriately meet along center line 262.

To further ensure appropriate simultaneous actuation of bay doors 194 and 196, the timing mechanism 218 is constructed and attached to the upper end of actuator arms 198 and 200. Control arms 280 and 282 are rigidly affixed to arms 198 and 200, respectively. These control arms are affixed for pivoting about pivot points 210 and 212, respectively, so that actuation of actuator arms 198 and 200 also pivots or rotates control arms 280 and 282. Control arm 280 is positioned at a specific angular relationship relative to actuator arm 198. The angle at which control arm 280 is attached with respect to actuator arm 198 and the angle at which control arm 282 is attached to actuator arm 200 are preferably selected with respect to each other so that connector rod 284 of timing mechanism 218 will be at substantially the same angular orientation 286 relative to the center line 262, both when bay doors 194 and 196 are in the closed position, as depicted in FIG. 10, and also when the bay doors 194 and 196 are in the open position corresponding to the rotated position of the actuator arms 198b and 200b, represented in phantom lines in FIG. 10. The length of arms 280 and 282 are also preferably equal so that connection pin 290, between arm 280 and connection bar 284, moves between a closed bay door position and an open bay door position through an arc 292. Similarly, connection pin 294, between arm 282 and connector bar 284, moves through an arc 296, which arc 296 is equal in length to arc 292 when the bay doors are moved between the open and closed positions a and b, respectively. Thus, the timing mechanism 218, with all of its parts as described above, acts to maintain control or "time" the opening or closing of actuator arms 198 and 200 the same amount and at the same rate, in opposite directions with respect to each other, when actuator cylinder 206 (not shown in FIG. 10), which connects at points 298 and 300, is expanded or contracted to move the actuator arms 198 and 200 between open and closed positions.

In one specific embodiment similar to that as depicted in FIG. 10, the radius from pivot points 210 to curved surface 268 of door 194 is approximately 34 inches, the bay opening, from one side to the other, is approximately 54 inches so that each door must move in an arc a distance of about 27 inches between a fully closed and fully open position. In this embodiment, each arm 198 and 200 is rotated through an angle measuring between about 40° and 45° to move the bay doors between fully open and fully closed positions. Similarly, the arcs 292 and 296, traversed by connector pins 290 and 294, also measure between about 40° and 45°. Arms 280 and 282 each have a length of about 9 inches. The angular position of pin 290, with respect to pivot point 210, at the closed door position moves in a counter-clockwise direction from a position at 200°, measured counter-clockwise from the vertical through pin 210, to a position at approximately 240°, measured in the same counter-clockwise direction.

Pin 294 pivots about pivot point 212, from a position at about 20°, measured in a clockwise direction from the vertical, to a position at about 60°, measured in the same direction. For purposes of this invention, one important configuration is that pin 290 is below center and pin 294 is above center, so that they move in the same direction when the actuator arms move in opposite directions. In this configuration, connector rod 284 of timing device 218 is maintained in approximately the same angular orientation at the beginning and ending points of rotation between closed and open positions and the lengths of the control arms are the same, so that both actuator arms move the same amount and at the 30 same rate. The length of arms 280 and 282, relative to the length of the actuator arms 198 and 200 and the opening distance, and also the spatial relationship between pivot points 210 and 212, will all affect the angle 286 and will determine the angular orientation of arms 280 and 282, relative to arms 198 and 200. However, with the angular orientation 286 of connector rod 284 maintained throughout the rotation, the movement of timing device 218 is substantially in a linear direction, with only small variations due to the arcs 292 and 296. This device keeps both actuator arms 198 and 200 opening substantially the same amount in opposite directions with respect to each other.

Also depicted in FIG. 10, in hidden lines, is the reinforced construction of bay doors 194 and 196 in which the interior arcuate surfaces 268 and 270 are supported with exterior spaced-apart walls 302 and 304, between which interior surface 268 and exterior wall 302 rib or strut supports 306 extending along the length of the door are rigidly fastened, such as by welding, and preferably at slight angular relationships to form a substantially rigid door structure capable of withstanding a substantial amount of weight which may be applied along the entire bay opening. Similarly, a plurality of ribs 308 are welded to the exterior wall 304 and interior curved surface 270 to form a rigid, yet lightweight, door 196. Also depicted in FIG. 10 are opening holes 310 through which hydraulic pipelines are connected between actuating cylinders 206 and 208 at either end of the hopper assembly.

Also shown in FIG. 10 are the details of one embodiment of an adjuster mechanism of the adjustment portion of timing and adjustment mechanism 218. In this embodiment, connector rod 284 comprises a round rod, having threaded portions 312 and 314, onto which devises 316 and 318 are threadably connected. The devises 316 and 318 connect, through pins 290 and 294, to the control arms 280 and 282, respectively. Thus, the overall length of mechanism 218, between connector pins 290 and 294, can be adjusted by removing one of the pins 290 or 294 and rotating the clevis ends 316 and/or 318 with respect to rod 284, thereby increasing or decreasing the overall length of the rod 284. The desired length is such that doors 194 and 196 abut against each other at points 320 and 322 on each door, respectively, at a common point of contact along center line 262.

Figures 11, 12:
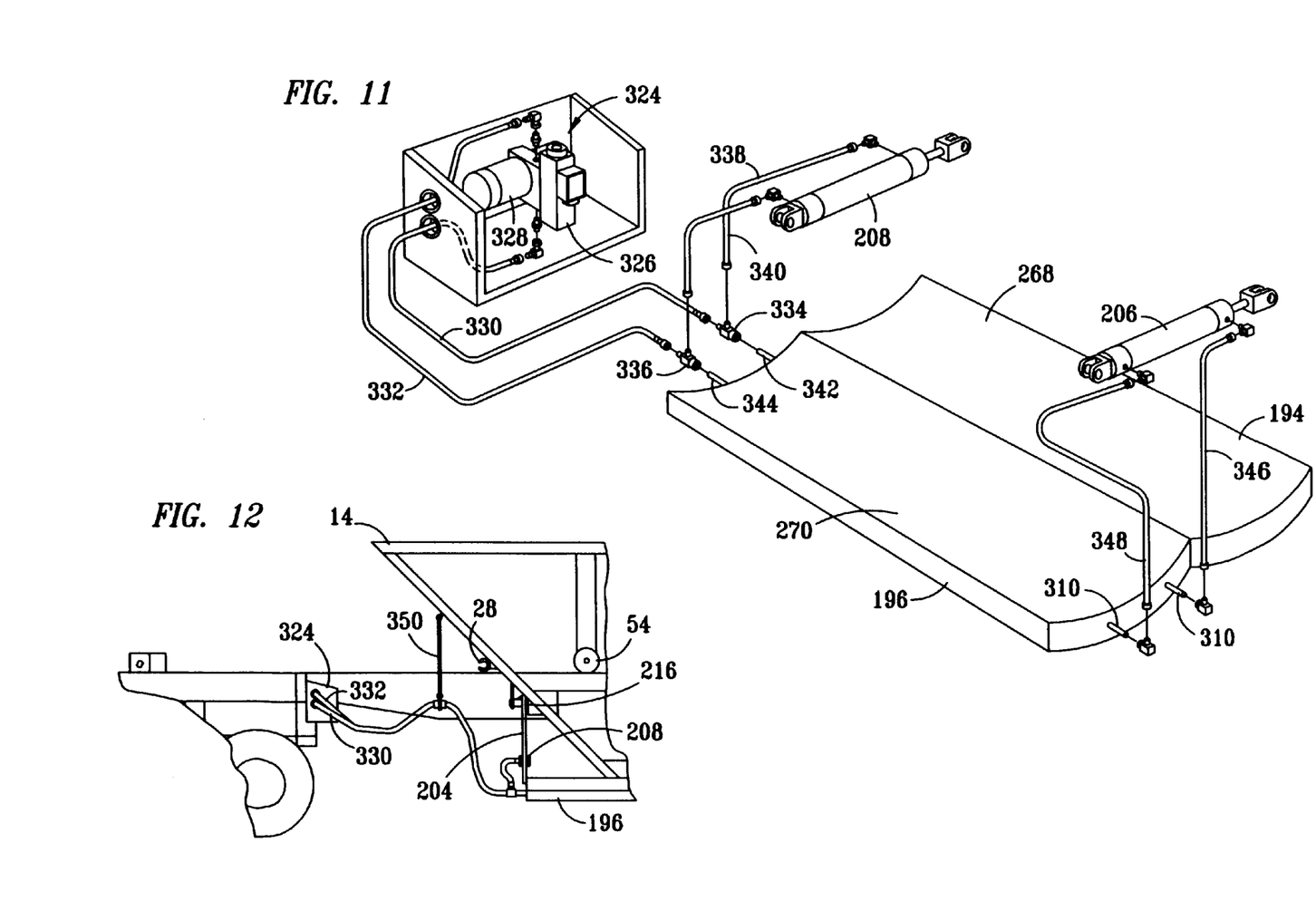
FIG. 11 is a schematic perspective partial assembly view, depicting the attachment of a hydraulic hopper door cylinder mechanism, as well as an electrically-powered hydraulic pump assembly.
FIG. 12 is a schematic partial cut-away view of a vehicle depicting an embodiment of a pump assembly and hydraulic connection lines mounted in the proximity of the end-dumping pivot points for the hopper assembly carried in a vehicle frame.

Referring now to FIG. 11, in which a schematic assembly view of the hopper doors and the hydraulic actuating system in a perspective view is depicted, a hydraulic pressure supply 324 which, in the preferred embodiment, comprises a hydraulic pump 324, which is driven with an electrical motor 328, is interconnected through pressure lines 330 and 332 to both cylinders 206 and 208. Further, advantageously, pressure lines 330 and 332 connect as at T-connectors 334 and 336, and also through lines 338 and 340 to opposite ends of hydraulic cylinder 208. Thus, hydraulic cylinder 280 may be actuated in either direction, as desired, depending upon the pumping direction of pump 324 which, for example, may be determined by the direction of rotation of motor 328, or otherwise with appropriate valves, such as with a solenoid operated valve 326 which changes the direction of hydraulic fluid flow without reversing the direction of motor 328. T-connectors 334 and 336 are also connected to transfer pipes 342 and 344, which communicate the pressurized hydraulic fluid through orifices 310 in door 196, from one end of door 196 to the other end. At the opposite end of door 196, L-connectors may be used to connect transfer pipes 342 and 344 to connector lines 346 and 348, which interconnect with opposite ends of hydraulic cylinder 206. Thus, cylinders 206 and 208 are operated simultaneously, either expanding or contracting, depending upon the pressurization direction from pressure supply 324.

FIG. 12 depicts a partial side cut-away view of a trailer according to the present invention, having hopper 14 held therein. The hydraulic pressure source 324 which, as indicated above, may advantageously be a hydraulic pump 324, which is electrically driven with a motor 328, and/or which has its direction of flow controlled with valve 326, so that electrical controls from the cab of the vehicle may be used to actuate the hydraulic cylinders 206 and 208, as desired, for opening the hopper bay doors 194 and 196. In the embodiment shown, hydraulic pressure lines 330 and 332 are depicted, extending from pressure supply 324, which pressure supply 324 is advantageously positioned between lower pivot point 26 and upper pivot point 72. In this advantageous configuration, pressure lines 330 and 332 need not be inordinately long but are, nevertheless, provided with adequate length and are sufficiently flexible to allow repeated pivoting of the hopper for rear dumping without damaging or fatiguing the pressure supply lines. To facilitate ease of management and to further avoid damage to the pressure supply lines 330 and 332, they may be tethered as at 350, flexibly holding the lines from the hopper so that kinking is further avoided.

Thus, what has been shown is an improved belly-dumping/end-dumping vehicle, and particularly a reduced weight vehicle having hopper side rollers that allow the end dumping capability combined with belly-dumping capabilities. The hopper is provided with bay doors which are pivotably connected at spaced-apart pivot points and which doors have a radius of curvature corresponding to the distance to the pivot points so that the doors are held closed by a slightly larger portion of the weight of a granular load than the portion of the weight tending to open the doors. Further, a timing mechanism and adjustment mechanism is provided which causes both bay doors to be opened or closed an equal distance in opposite directions upon actuation of hydraulic actuating cylinders. The hydraulic pressure support is mounted in the proximity of the end-dumping pivot points, so that excessive hydraulic hose need not be used to accomplish both end-dumping and bottom-dumping capabilities. An electric over hydraulic system is used to provide reliable control from a remote location, such as from the cab of a truck or tractor. Also, the curved belly doors are reinforced with ribs, extending along the length thereof, to provide strength and further to provide protective covering for transfer hydraulic piping interconnecting front and rear hydraulic belly bay actuating cylinders simultaneously.

Other alterations and modifications of the invention will otherwise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A dual use belly dumping and end dumping vehicle, comprising:

(a) a frame, having left and right side beams connected together to form an opening therebetween, said frame mounted on rear wheels for transport;

(b) a hopper with sides, ends and an openable bottom, said hopper carried in said opening, between said left and right side beams in said frame;

(c) rollers mounted to said sides of said hopper for rollingly supporting said hopper on top of said left and right side beams of said frame;

(d) pivot bars mounted on said frame above said rear wheels;

(e) pivot sockets mounted on said hopper for engaging said pivot bars when said hopper is rolled rearward along said side beams from a transport position to a pivot engagement position, said sockets constructed for releasable engaged pivoting of said hopper about said pivot bars to a dumping position at which said hopper is raised at an angle and an end of said hopper dumps the content thereof behind said rear wheels; and (f) hydraulic cylinders mounted between sides of said frame and the sides of said hopper for retractably rolling said hopper from said transport position to said pivot engagement position and to said angled dumping position.

* * * * *

UNITED STATES PATENT AND TRADEMARK OFFICE
CERTIFICATE OF CORRECTION

PATENT NO. : 6,217,122 B1
DATED : April 17, 2001
INVENTOR(S) : Martin Kirbie

It is certified that error appears in the above-identified patent and that said Letters Patent is hereby corrected as shown below:

Column 2,
Line 47, "alternative of hopper" should be -- alternative embodiments of hopper --.

Column 13,
Line 63, "at the 30 same rate" should be -- at the same rate --.

Column 14,
Line 28, "onto which devises" should be -- onto which clevises --.
Line 29, "The devises 316" should be -- The clevises 316 --.

Column 16,
Line 29, "said sockets" should be -- said pivot sockets --.

Signed and Sealed this

Eleventh Day of December, 2001

Attest:

NICHOLAS P. GODICI
*Attesting Officer*       *Acting Director of the United States Patent and Trademark Office*